United States Patent Office 2,766,432
Patented Oct. 9, 1956

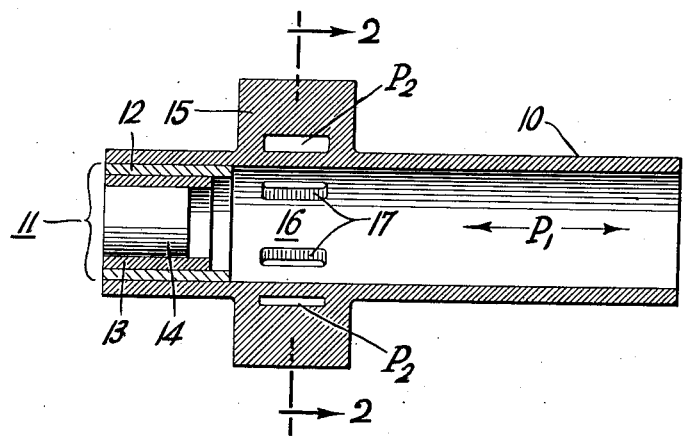
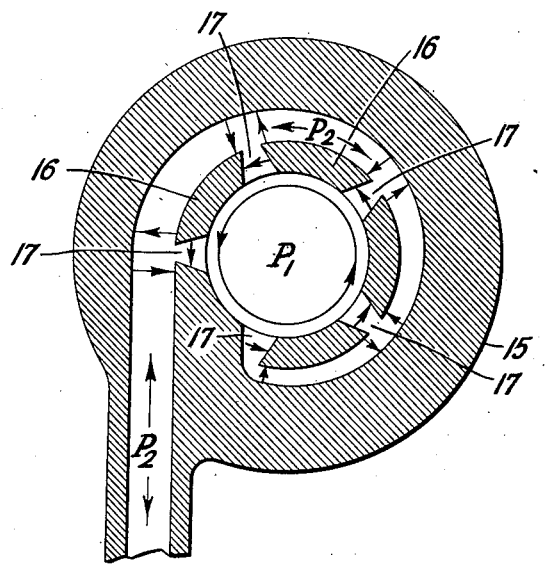

2,766,432

WAVE GUIDE TRANSITION

Richard M. Walker, Dorchester, Mass., assignor to Sylvania Electric Products, Inc., a corporation of Massachusetts Application September 6, 1950, Serial No. 183,352

9 Claims. (Cl. 333—21)

The present invention relates to electromagnetic wave guide transitions and, particularly, to a transition of a type particularly suited for intercoupling a circular wave guide operated in the $TE_{01}$ mode and a rectangular wave guide operated in the $TE_{10}$ mode.

For reasons well known, it is desirable to employ a rectangular wave guide in many ultra-high-frequency radio applications, particularly for convenience in coupling the wave guide to existing types of magnetrons, transmit-receive boxes, mixers, and the like. On the other hand, a circular wave guide operated in the $TE_{01}$ mode has the unique and important advantage that its attenuation is appreciably lower than that of a rectangular wave guide and decreases with increasing cross-sectional sizes of the wave guide. The $TE_{01}$ mode in the circular wave guide may ordinarily be difficult to handle, however, because four other modes will also propogate in a circular wave guide just large enough to support the $TE_{01}$ mode. These other modes are the $TE_{11}$, $TM_{01}$, $TE_{21}$, and $TM_{11}$.

The present application is related to applicant's copending application Serial No. 183,351, filed concurrently herewith and assigned to the same assignee as the present application.

It is an object of the present invention to provide a novel wave guide transition for intercoupling circular and rectangular wave guides and one which permits the operation of the rectangular wave guide in the $TE_{10}$ mode with operation of the circular wave guide in the $TE_{01}$ mode without at the same time creating by the transition any undesired modes which may not be readily suppressed by well known means.

It is a further object of the invention to provide a new and improved wave guide transition wherein the wave impedance along the propogation path through the transition is not subject to any substantial impedance discontinuities of the type which give rise to undesirable reflection of wave-signal energy.

For a better understanding of the present invention, together with other and further objects thereof, reference is had to the following description taken in connection with the accompanying drawing, and its scope will be pointed out in the appended claims.

Referring now to the drawing, Fig. 1 is a longitudinal cross-sectional view of a wave guide transition embodying the present invention, and Fig. 2 is a transverse cross-sectional view taken along the plane 2—2 of Fig. 1.

The wave guide transition of the present invention includes a first conductive wave guide portion 10 of hollow circular cross-section providing a first wave-propogation path $P_1$. The transition also includes a second conductive wave guide portion 15, shown integral with the portion 10, of hollow rectangular cross-section providing a second wave-propogation path $P_2$ normal to the first path $P_1$. The two wave guide portions 10 and 15 include a conductive wall portion 16 common to the first and second propogation paths, the wall portion 16 having a plurality of slot apertures 17 which are shown symmetrical about a plane normal to the axis of the wave guide portion 10 and which permit electromagnetic wave coupling between the first and second wave-propogation paths $P_1$ and $P_2$. As will be seen from Fig. 1, the long dimension of the slots is longitudinal of the wave guide portion 10. The slots are spaced around the first propogation path $P_1$ by a value equal to one wave length in the second wave-propogation path $P_2$.

Referring now more particularly to Fig. 2, the conductive wall portion 16 has a wall which is relatively thin or which has a thickness equal to a substantial fraction of the wave length of the wave energy propogated through the transition. A thickness equal to one-quarter wave length provides a small coefficient of coupling between the wave-propogation paths $P_1$ and $P_2$ although insuring a broad-band characteristic. On the other hand, a wall thickness equal to one-half wave length provides approximately the largest coefficient of coupling between the wave-propogation paths $P_1$ and $P_2$ although the transition is then more frequency selective. The wall thickness to be used in a particular application may thus be readily chosen on a satisfactory compromise basis.

Impedance matching between the first and second wave-propogation paths $P_1$ and $P_2$ is effected in part by narrowing the width of the slotted apertures 17 in the direction from the circular wave guide to the rectangular wave guide. In particular, the slot apertures 17 are so designed that the fraction of wave-signal energy coupled through each slot into the circular wave guide is equal to the reciprocal of the number of slots, and the slot width is determined in relation to the length of the slot such that the circular wave guide characteristic impedance divided by the number of slots has an impedance value which, when transferred through the slot, presents a series impedance in the rectangular wave guide that is equal to the impedance of the latter divided by the number of coupling apertures less one.

It will further be seen in Fig. 2 that the end of the path $P_2$ is immediately adjacent one of the slots, and that the narrow transverse dimension of the rectangular wave guide has a value which increases at a uniform rate between successive ones of the apertures 17 from the most remote aperture to the end of the coupling region. This tapering of the rectangular wave guide equalizes the flow of wave-signal energy through the coupling apertures between the rectangular and circular wave guides while insuring that the wave impedance along the wave-propogation path through the transition is substantially free of impedance discontinuities which are undesirable for well known reasons.

A transition embodying the present invention has the important advantage that any odd number of coupling apertures 17 may be readily used, applicant having found that the undesired modes excited by multiple coupling points in a transition are minimized when the number of coupling points is an odd number. In such a case, and if $n$ coupling apertures are employed, the only undesired modes likely to be excited are the $TE_{11}$ and $TE_{n1}$ modes of which the former is generally of insignificantly small energy content and the latter may readily be suppressed by such choice of the internal diameter of the circular wave guide portion 10 that it operate below cut-off for the $TE_{n1}$ mode. Conventional mode suppressors, for example one formed of a system of radial wires, may be employed in well known manner in the circular wave guide portion 10 further to suppress any undesired mode which may be considered troublesome. The circular wave guide portion 10 is closed at one end by a cylindrical conductive member 11 which effectively includes a stepped bore of dimensions selected to reduce the magnitude of any excitation in the path $P_1$ tending to cause wave-signal propogation by modes differing from the $TE_{01}$ mode desired. The member 11 as shown includes telescoped conductive cylindrical members 12 and 13 and a conductive plug 14. The internal diameter of the cylinder 12, and the external diameter of the cylinder 13, is selected to form a circular wave guide which will propogate the $TE_{11}$ and possibly the $TE_{n1}$ modes but which operates below cut-off for the $TE_{01}$ mode. The inner diameter of the cylinder 13, and outer diameter of the plug 14, is selected to form a circular wave guide which will propogate the $TE_{11}$ mode but which operates below cut-off for the $TE_{n1}$ mode. The cylinder 12 is adjusted along the wave guide section 10 to a position with relation to the coupling region, presently to be discussed, such that maximum transfer of power along path $P_1$ in the $TE_{01}$ mode is effected. The cylinder 13 is then adjusted in like manner to give minimum excitation in the $TE_{n1}$ mode, and the plug 14 is adjusted to give minimum excitation in the $TE_{11}$ mode. This adjustment process may be repeated several times in order to obtain the maximum suppression of the unwanted modes and a matched system.

In operation, electromagnetic wave energy propogated through the rectangular wave guide in the $TE_{10}$ mode is transferred through the coupling apertures 17 to excite the circular wave guide in the $TE_{01}$ mode, or vice versa. The arrows in Fig. 2 indicate the electric-field relationships occurring at selected regions in the transition, and it will be seen that each coupling slot 17 is coupled to the path $P_2$ of the rectangular wave guide portion 15 by a form of T junction. These T junctions in association with the tapered width of the propogation path $P_2$ explain the energy division among the coupling apertures and the impedance matching relationships earlier described. If more coupling apertures are desired than are permitted by one turn of the rectangular wave guide around the circular wave guide, the rectangular wave guide may be "wrapped" as a spiral extending longitudinally of the latter as long as the space-phase relationships of the coupling apertures with the propogation paths $P_1$ and $P_2$ are maintained. Any undesired mode excited in the circular wave guide by such transfer of energy may be effectively and readily suppressed by adjustment of the terminating member 11 used alone or in conjunction with a simple form of well known mode suppressor and by suitable choice of the internal diameter of the circular wave guide portion 10.

A modified form of transition which also readily permits an odd number of coupling points is disclosed and claimed in the Daniel A. Lanciani application Serial No. 183,371, filed concurrently herewith and assigned to the same assignee as the present application.

While there has been described what is at present considered to be the preferred embodiment of the invention, it will be obvious to those skilled in the art that various changes and modifications may be made therein without departing from the invention. Consequently, the appended claims should be interpreted broadly, as may be consistent with the spirit and scope of the invention.

What I claim is:

1. A wave guide transition comprising a first wave guide portion of circular cross-section providing a first wave-propogation path and a second wave guide portion of rectangular cross-section providing a second wave-propogation path normal to and only partially encircling said first path, said wave guide portions including a conductive wall which is common to said propogation paths and has a plurality of apertures spaced longitudinally of and in the direction of energy flow through said second path to permit electromagnetic wave coupling between said paths.

2. A wave guide transition comprising a first wave guide portion of circular cross-section providing a first wave-propogation path and a second wave guide portion of rectangular cross-section providing a second wave-propogation path normal to and only partially encircling said first path, said wave guide portions including a conductive wall which is common to said propogation paths and has a plurality of apertures spaced longitudinally of and in the direction of energy flow through said second path to permit electromagnetic wave coupling between said paths, the narrow transverse dimension of said second path having a value which increases between successive ones of said apertures over the coupling region of said paths.

3. A wave guide transition comprising a first conductive wave guide portion of hollow circular cross-section providing a first wave-propogation path and a second conductive wave guide portion of hollow rectangular cross-section providing a second wave-propogation path normal to and only partially encircling said first path, said wave guide portions including a conductive wall which is common to said propogation paths and has a plurality of apertures spaced longitudinally of and in the direction of energy flow through said second path to permit electromagnetic wave coupling between said paths.

4. A wave guide transition comprising a first wave guide portion of circular cross-section providing a first wave-propogation path and a second wave guide portion of rectangular cross-section providing a second wave-propogation path normal to and only partially encircling said first path, said wave guide portions including a conductive wall which is common to said propogation paths and has a plurality of slot apertures spaced longitudinally of and in the direction of energy flow through said second path to provide electromagnetic wave coupling between said paths, said aperture spacing having a value approximately equal to one wave length in said second path and the slot length extending longitudinally of said first path.

5. A wave guide transition comprising a first wave guide portion of circular cross-section providing a first wave-propogation path and a second wave guide portion of rectangular cross-section providing a second wave-propogation path normal to and only partially encircling said first path, said wave guide portions including a conductive wall which is common to said propogation paths and has an odd number of slot apertures spaced longitudinally of and in the direction of energy flow through said second path to provide electromagnetic wave coupling between said paths, said aperture spacing having a value approximately equal to one wave length in the second path and the slot length extending longitudinally of said first path.

6. A wave guide transition comprising a first conductive wave guide portion of hollow circular cross-section providing a first wave-propogation path and a second conductive wave guide portion of hollow rectangular cross-section providing a second wave-propogation path normal to and only partially encircling said first path, said wave guide portions including a common conductive wall having a wall thickness equal to a substantial fraction of the wave length of wave energy propogated through said paths and said wall having a plurality of slot apertures spaced longitudinally of and in the direction of energy flow through said second path to provide electromagnetic wave coupling between said paths, each of said slots being of given length but decreasing in width through said wall in the direction from said first path to said second path.

7. A wave guide transition comprising a first wave guide portion of circular cross-section providing a first wave-propogation path and a second wave guide portion of rectangular cross-section providing a second wave-propogation path normal to and only partially encircling said first path, said wave guide portions including a conductive wall which is common to said propogation paths and has a plurality of apertures spaced longitudinally of and in the direction of energy flow through said second path to permit electromagnetic wave coupling between said paths, the narrow transverse dimensions of said second path and the number and dimensions of said apertures having values selected to minimize in said second path any reflection of wave-signal energy flowing therein toward each coupling aperture.

8. A wave guide transition comprising a first wave guide portion of circular cross-section providing a first wave-propogation path and a second wave guide portion of rectangular cross-section providing a second wave-propogation path normal to and only partially encircling said first path, said wave guide portions including a conductive wall which is common to said propogation paths and has a plurality of apertures spaced longitudinally of and in the direction of energy flow through said second path to permit electromagnetic wave coupling between said paths, and a closed cylindrical conductive member terminating said first path at one end thereof and effectively including a stepped bore of dimensions selected to reduce the magnitude of wave-signal propogation by modes differing from that desired for said first path.

9. A wave guide transition comprising a first wave guide portion of circular cross-section providing a first wave-propogation path and a second wave guide portion of rectangular cross-section providing a second wave-propogation path normal to and only partially encircling said first path, said wave guide portions including a conductive wall which is common to said propogation paths and has a plurality of apertures spaced longitudinally of and in the direction of energy flow through said second path to permit electromagnetic wave coupling between said paths, said second wave guide portion providing a wall parallel to said conductive wall but spaced therefrom by a value which increases at a constant rate between successive ones of said apertures and over the coupling region of said paths.

References Cited in the file of this patent

UNITED STATES PATENTS

| | | |
|---|---|---|
| 2,405,242 | Southworth | Aug. 6, 1946 |
| 2,433,011 | Zaleski | Dec. 23, 1947 |
| 2,471,021 | Bradley | May 24, 1949 |
| 2,481,151 | Powers | Sept. 6, 1949 |
| 2,484,822 | Gould | Oct. 18, 1949 |
| 2,513,205 | Roberts | June 27, 1950 |
| 2,560,353 | Kerwien | July 10, 1951 |
| 2,568,090 | Riblet | Sept. 18, 1951 |
| 2,676,306 | Lanciani | Apr. 20, 1954 |